United States Patent
Fanduzzi et al.

(10) Patent No.: US 11,233,469 B2
(45) Date of Patent: Jan. 25, 2022

(54) VARIABLE FREQUENCY DRIVE MOTOR CONNECTION MODULE

(71) Applicant: Eaton Intelligent Power Limited, Dublin (IE)

(72) Inventors: Peter Joseph Fanduzzi, Kenosha, WI (US); Thomas M. Ruchti, Pewaukee, WI (US); Joseph Uphaus, Whitefish Bay, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/803,215

(22) Filed: Feb. 27, 2020

(65) Prior Publication Data
US 2020/0336089 A1    Oct. 22, 2020

Related U.S. Application Data

(60) Provisional application No. 62/836,244, filed on Apr. 19, 2019.

(51) Int. Cl.
| | |
|---|---|
| *H02P 1/54* | (2006.01) |
| *H02P 5/00* | (2016.01) |
| *H02P 5/46* | (2006.01) |
| *H02P 5/50* | (2016.01) |

(52) U.S. Cl.
CPC ....................... *H02P 5/50* (2013.01)

(58) Field of Classification Search
CPC ........................................................ H02P 5/50
USPC ............................................................ 318/98
See application file for complete search history.

(56) References Cited

U.S. PATENT DOCUMENTS

| | | | |
|---|---|---|---|
| 2014/0268432 A1* | 9/2014 | Blakely | H02P 29/64 |
| | | | 361/31 |
| 2019/0199263 A1* | 6/2019 | Li | H02H 9/02 |

OTHER PUBLICATIONS

Motors: Specification of Electric Motors, WEG Group, Dec. 2016.

\* cited by examiner

*Primary Examiner* — Erick D Glass
(74) *Attorney, Agent, or Firm* — DiBerardino McGovern IP Group LLC

(57) ABSTRACT

A system for controlling a plurality of motors includes: a variable frequency drive (VFD) configured to control at least one property of the motors, the VFD having a current interruption rating that is greater than a continuous current rating of all of the plurality of motors combined; a bus electrically connected to the VFD; and a plurality of protection modules, each protection module including: a motor overload device electrically connected to a particular one of the plurality of motors; and a switching relay in series with the motor overload device, the switching relay configured to connect the protection module to and disconnect the protection module from the bus. A state of the switching relay determines whether the protection module is electrically connected to the bus, the VFD is configured to control the state of the switching relay, and the switching relay has a current interruption rating that is less than the continuous current rating of the particular one of the plurality of motors.

20 Claims, 4 Drawing Sheets

VARIABLE FREQUENCY DRIVE MOTOR CONNECTION MODULE

CROSS-REFERENCE TO RELATED APPLICATION

This application claims the benefit of U.S. Provisional Application No. 62/836,244, filed on Apr. 19, 2019 and titled VARIABLE FREQUENCY DRIVE MOTOR CONNECTION MODULE, which is incorporated herein by reference in its entirety.

TECHNICAL FIELD

This disclosure relates to a module for use with a variable frequency drive (VFD).

BACKGROUND

An electric motor converts electrical energy into mechanical energy that is provided to a load. A variable frequency drive (VFD) may be used to control the electric motor.

SUMMARY

In one aspect, a system for controlling a plurality of motors includes: a variable frequency drive (VFD) configured to control at least one property of the motors, the VFD having a current interruption rating that is greater than a continuous current rating of all of the plurality of motors combined; a bus electrically connected to the VFD; and a plurality of protection modules, each protection module including: a motor overload device electrically connected to a particular one of the plurality of motors; and a switching relay in series with the motor overload device, the switching relay configured to connect the protection module to and disconnect the protection module from the bus. A state of the switching relay determines whether the protection module is electrically connected to the bus, the VFD is configured to control the state of the switching relay, and the switching relay has a current interruption rating that is less than the continuous current rating of the particular one of the plurality of motors.

Implementations may include one or more of the following features. The system also may include a housing that holds the VFD, the bus, and the plurality of protection modules. Each protection module also may include a printed circuit board (PCB) that is mountable in the housing, and the motor overload device and the switching relay are mounted to the PCB. Each protection module also may include a terminal block mounted on each PCB, and the particular one of the motors and the motor overload device are electrically connected to each other via the terminal block. The bus may be a backplane that is mountable in the housing, the backplane including a plurality of electrical connectors in parallel with each other, and each PCB is mounted to one of the plurality of electrical connectors such that all of the protection modules are connected to the backplane and are in parallel with each other.

Each motor overload device may include at least one sensing device configured to determine at least one operating metric of the particular one of the plurality of motors, and the VFD may receive information about the at least one operating metric from all of the protection modules that are electrically connected to the bus. The at least one sensing device may include a current sensor and/or a voltage sensor, and the operating metric includes an amount of current drawn by the particular one of the plurality of motors, a phase of current drawn by the particular one of the motors, and/or a voltage applied to the particular one of the plurality of motors. The VFD may be configured to analyze the information and determine whether one or more of the plurality of motors is in a fault condition.

The VFD may be configured to prevent electricity from flowing to the bus based on a determination that at least one of the plurality of motors is in a fault condition. The VFD may be configured to determine which one or more of the plurality of motors is in a fault condition and to change the state of the switching relay in the one or more protection modules connected to the one or more of the plurality of motors in the fault condition such the one or more protection modules are disconnected from the bus. The VFD may be configured to allow electricity to flow to the bus such that electricity is provided to all of the motors except for the one or more motors that are in the fault condition after the one or more protection modules are disconnected from the bus. Each of the motors may include an element that is configured to spin, and the VFD is configured to allow electricity to flow to the bus after the one or more protection modules are disconnected from the bus and before all of the motors stop spinning.

The motor overload device may be configured to: sense at least one operating metric of a current drawn by the particular one of the motors and determine an indication of the at least one operating metric, and the VFD may be configured to control the state of the switching relay based on the indication of the sensed operating metric. The motor overload device may include: a sensing device, an electronic storage, and one or more electronic processors, and, the electronic storage may include information related to at least one current threshold at which to disconnect the protection module from the bus. To determine an indication of the at least one operating metric, the motor overload device may be configured to compare a sensed amount of current drawn by the particular one of the plurality of motors to the information related to the at least one current threshold at which to disconnect the protection module from the bus, and the indication of the at least one operating metric may include an indication of whether the sensed amount of current drawn meets or exceeds the at least one current threshold at which to disconnect the protection module from the bus.

The motor overload device may include a normally open relay and a normally closed relay.

In another aspect, an apparatus for use with a plurality of motors includes: a plurality of protection modules, each protection module being configured for connection to a bus and to a particular one of the plurality of motors, each protection module including: a motor overload device electrically connected to a particular one of the plurality of motors; and a switching relay in series with the motor overload device, the switching relay configured to connect the protection module to and disconnect the protection module from the bus. A state of the switching relay determines whether the protection module is electrically connected to the bus, and the switching relay has a current interruption rating that is less than the continuous current rating of the particular one of the plurality of motors.

Implementations may include one or more of the following features. The bus may be configured for connection to a variable-frequency drive (VFD) that has a current interruption rating that is at least equal to a continuous current rating of all of the plurality of motors combined.

Each protection module also may include a printed circuit board (PCB), and, in these implementations, the motor overload device and the switching relay are mounted on the PCB.

The motor overload device may include a sensor configured to sense an operating metric of the particular one of the plurality of motors and to determine an indication of the operating metric, and the state of the switching relay may be based on the indication of the operating metric.

Implementations of any of the techniques described herein may include a system, an apparatus, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
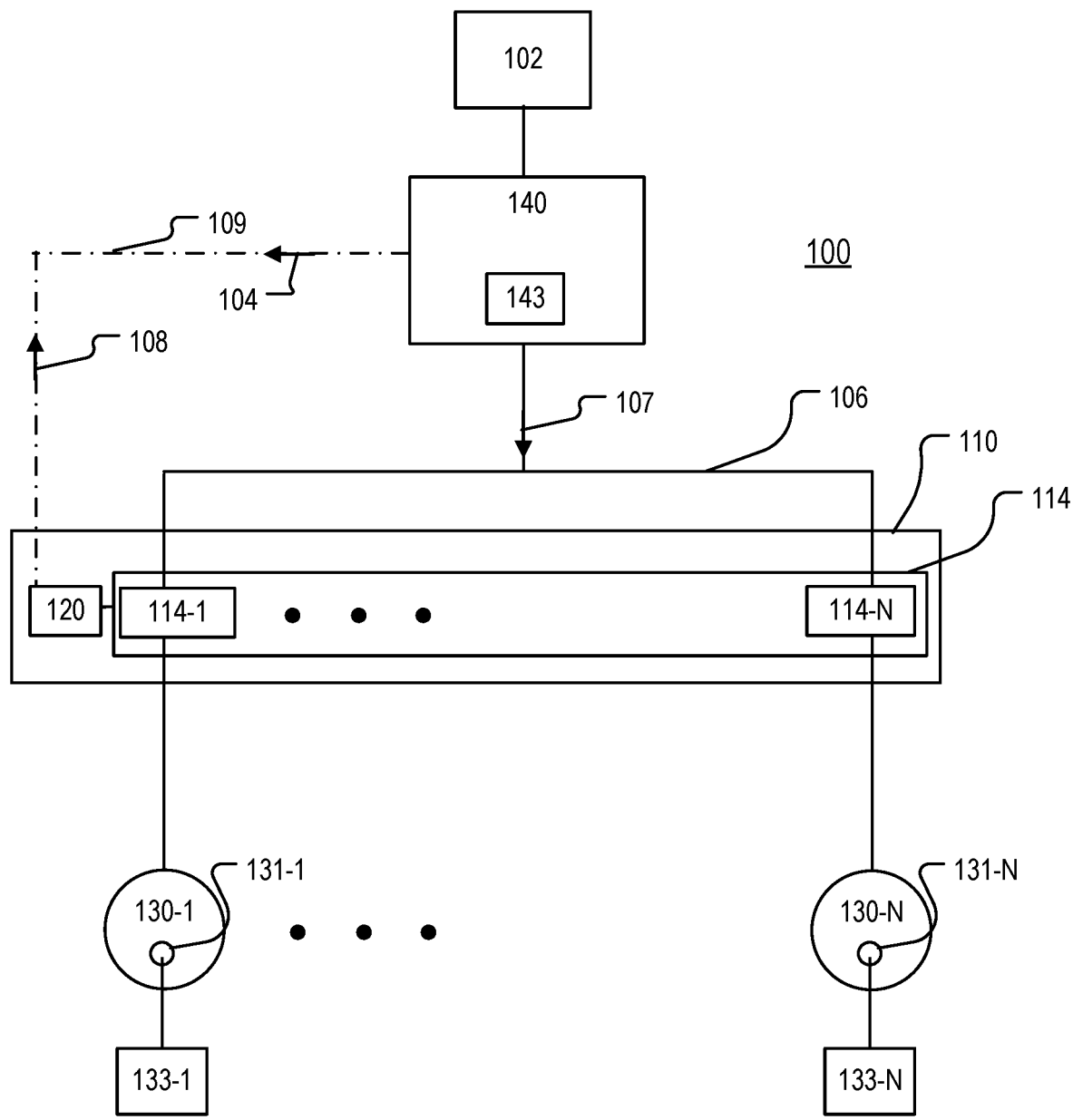
FIG. 1 is a block diagram of an example of a system that includes a protection apparatus and a variable frequency drive (VFD).

FIG. 1 is a block diagram of a system 100 that includes a protection apparatus 110 and a variable frequency drive (VFD) 140. The protection apparatus 110 allows the VFD 140 disconnect from or connect to each motor 130-1 to 130-N individually, as discussed below.

The protection apparatus 110 is electrically connected to a plurality of alternating current (AC) motors 130-1 to 130-N, where N is any integer number that is greater than or equal to two. The protection apparatus 110 includes a switching apparatus 114. The switching apparatus 114 includes a respective switching relay 114-1 to 114-N for each motor 130-1 to 130-N. Each switching relay 114-1 to 114-N has at least two states, a first state in which the respective motor 130-1 to 130-N is electrically connected to a bus 106, and a second state in which the respective motor 130-1 to 130-N is electrically disconnected from the bus 106. The bus 106 is electrically connected to the variable frequency drive (VFD) 140. As such, the state of the switching relay 114-1 to 114-N determines whether the respective motor 130-1 to 130-N is electrically connected to the bus 106 and to the motor driver control system 140.

The VFD 140 receives alternating current (AC) power from a power source 102 and provides a driver signal 107 to the bus 106. The power source 102 may be, for example, an electrical power distribution network or an electrical power grid that distributes three-phase electrical power having a fundamental frequency of 60 Hertz (Hz). The driver signal 107 may be, for example, an AC voltage signal that has an amplitude that is sufficient to operate the motors 130-1 to 130-N. The VFD 140 controls the torque and speed of the motors 130-1 to 130-N by varying a frequency and/or voltage of the driver signal 107.

Each of the motors 130-1 to 130-N includes a respective movable element 131-1 to 131-N that moves in response to the application of the driver signal 107. For example, the movable elements 131-1 to 131-N may be rotors that rotate relative to respective stators in response to application of the driver signal 107. Each motor 130-1 to 130-N converts the electrical energy in the driver signal 107 into mechanical energy that drives a respective load 133-1 to 133-N. Each load 133-1 to 133-N may be, for example, a fan or a pump.

The VFD 140 has a current interruption rating that is equal to or greater than the continuous current rating of all of the motors 130-1 to 130-N combined. A current interruption rating indicates a maximum amount of current that a device may interrupt or halt. A continuous current rating indicates the maximum current that may be drawn by a device over a finite amount of time without exceeding a predefined limit. For example, the predefined limit may be a temperature above which damage to the device and/or suboptimal performance occurs. Thus, the VFD 140 is able to interrupt the electrical driver signal 107 such that none of the motors 130-1 to 130-N are powered, and the switching relays 114-1 to 114-N do not have to be configured to interrupt the current drawn by the respective motor 130-1 to 130-N. As such, the current interruption rating of each switching relay 114-1 to 114-N may be less than the continuous current rating of the respective motor 130-1 to 130-N. Thus, as compared to a configuration in which the switching apparatus 114 is relied upon to break the current to the motors 130-1 to 130-N, the electrical components used in the switching apparatus 114 (and each of the switching relays 114-1 to 114-N) are smaller, generate less heat, and/or are less expensive.

The protection apparatus 110 and the VFD 140 exchange information, signals, and/or commands over a control path 109 (shown with a dash-dot line style). The control path 109 is between an input/output 120 at the protection apparatus 110 and an input/output interface 143 at the VFD 140. The control path 109 may include any type of wired or wireless medium that is capable of transmitting data, including, for example, information and/or commands. For example, the control path 109 may include electrical cables and/or optical fiber cables. The control path 109 is bi-directional such that data 108 is transmitted from the protection apparatus 110 to the VFD 140 and control signals 104 are transmitted from the VFD 140 to the protection apparatus 110. The data 108 may be digital or analog, and the control signals may be digital or analog. In implementations in which the control path 109 is wireless, the I/O interface 143 and the I/O 120 include transceivers that are capable of providing and receiving data over a wireless control path 109.

The VFD 140 receives the data 108 from the protection apparatus 110. The data 108 may include, for example, numerical data that indicates how much current is drawn by the motors 130-1 to 130-N, or the data 108 may be a binary indication of whether at least one of the motors 130-1 to 130-N is drawing current that exceeds a predefined threshold. The VFD 140 determines whether to interrupt the motor driver signal 107 based on the data 108.

The VFD 140 also controls the state of each switching relay 114-1 to 114-N with the control signal 104. The state of each switching relay 114-1 to 114-N determines whether the respective motor 130-1 to 130-N is electrically connected to the bus 106. Thus, when used with the protection apparatus 110, the VFD 140 is also able to individually connect and disconnect each of the motors 130-1 to 130-N to thereby determine which of the motors 130-1 to 130-N receive the driver signal 107.

Figure 2:
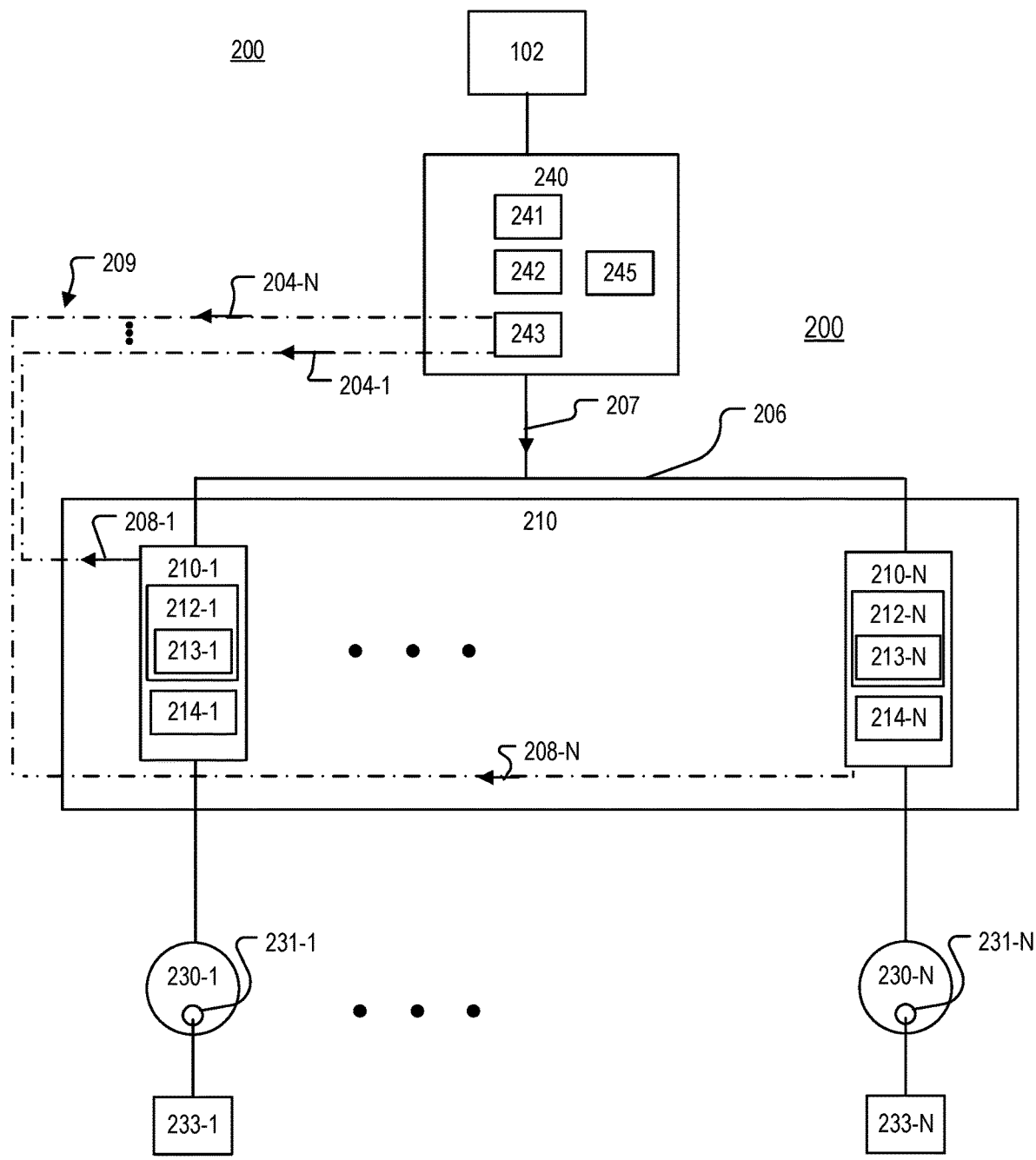
FIG. 2 is a block diagram of another example of a system that includes a protection apparatus and a variable frequency drive (VFD).

FIG. 2 is a block diagram of a system 200. The system 200 is an example of an implementation of the system 100. The system 200 includes a VFD 240 that drives N motors 230-1 to 230-N with a driver signal 207. N is any integer number that is greater than one. Thus, the system 200 drives a plurality of motors. Each of the motors 230-1 to 230-N is an AC motor that includes a respective movable element 231-1 to 231-N. The system 200 includes a protection apparatus 210 that communicates with the VFD 240 via a control path 209. The control path 209 is any type of communication path that allows the protection apparatus 210 and the VFD 240 to exchange information, commands, and/or data. The control path 209 may be a wired connection or a wireless connection, and the information, commands, and data may be digital or analog.

The protection apparatus 210 may communicate with the VFD 240 using a communications protocol. A communications protocol uses a series of bits to communicate status to the VFD 240. The protection apparatus 210 and the VFD 240 may leverage microcontrollers or similar devices to facilitate passage of the status. For example, the protection apparatus 210 may include an I/O (such as the I/O 120 of FIG. 1) that includes a microcontroller. In some implementations, the status may be passed from the protection apparatus 210 to the VFD 240 via an input/output on the protection apparatus 210. For example, the status of the protection apparatus 210 may be provided over a physical wire connected between the I/O on the protection apparatus 210 and an I/O interface 243 at the VFD 240. The output terminal on the protection apparatus 210, may be, for example, a pin connection, an electrical connection on a terminal block (such as the terminal block 320-1 shown in FIG. 3D). In the example of FIG. 2, the control path 209 may be, for example, a multi-wire cable that has at least N electrical cables, with one of the N cables being associated with one of the protection modules 210-1 to 210-N. Each of the N electrical cables is capable of transmitting electrical signals. The protection apparatus 210 allows the VFD 240 to control whether or not particular ones of the motors 230-1 to 230-N are electrically connected to the VFD 240.

The protection apparatus 210 includes protection modules 210-1 to 210-N. Each protection module 210-1 to 210-N is associated with a respective one of the motors 230-1 to 230-N. All of the protection modules 210-1 to 210-N generally include the same components and function in the same manner. For simplicity, only the protection module 210-1 is discussed in detail.

The protection module 210-1 includes a motor overload device 212-1 in series with a switching relay 214-1. The motor overload device 212-1 is an electronic overload topology that may or may not include a normally open or a normally closed relay. The motor overload device 212-1 includes a sensing module 213-1 that monitors at least one operating metric of the motor 230-1. The sensing module 213-1 includes a sensor, such as, for example, a current sensor and/or a voltage sensor. The sensing module 213-1 may include, for example, a sensor configured to sense one or more properties (such as amplitude, frequency, and/or phase) of electrical current drawn by the motor 230-1 and/or voltage applied to the motor 230-1. The sensing module 213-1 may include more than one sensor.

The operating metric is any measurable quantity related to the operation of the motor 230-1. For example, the operating metric may be a voltage applied to the motor 230-1 or a current drawn by the motor 230-1. The operating metric also may be a value that indicates a condition of the motor 230-1, such as a value that indicates whether the element 231-1 is moving.

The sensing module 213-1 also may include associated electronic elements that are used with the sensor. For example, the sensing module 213-1 may include an electronic processor, an electronic storage, and/or an interface for receiving electrical power to power the sensor and associated electronic elements. For example, the sensing module 213-1 may include an electronic storage that stores threshold current and/or voltage levels. When the sensor measures a current and/or a voltage that exceeds the threshold current and/or voltage, the data 208-1 produced by the sensor module 213-1 is a flag or binary value that only indicates that the threshold has been exceeded. In another example, the electronic storage may store the unique identifier and/or instructions for processing the sensed properties, and electronic processor may be used to generate the indication based on the sensed properties according to the stored instructions. The sensing module 213-1 produces an indication of the sensed property or properties and provides the indication to the VFD 240 as data 208-1.

The protection module 210-1 also includes the switching relay 214-1. The switching relay 214-1 includes one or more electronic components that are configured to have at least two states, a first state and a second state. For example, the switching relay 214-1 may include a transistor, diode, or a collection of electronic components (for example, transistors, resistors, diodes, and/or operational amplifiers) arranged in an electrical network that is configured for operation in at least the first state and the second state. In the first state, the switching relay 214-1 electrically connects the respective motor 230-1 to the bus 206. When the switching relay 214-1 is in the second state, the respective motor 230-1 is not electrically connected to the bus 206.

The switching relay 214-1 has a current interruption rating that is less than the continuous current rating of the motor 230-1. This allows the electronic component or components that are used in the switching relay 214-1 to be relatively small, inexpensive, and/or thermally efficient. Use of such electronic components allows the protection module 210-1 to be implemented on, for example, a printed circuit board (PCB). FIG. 3D shows an example of such an implementation.

All of the protection modules 210-1 to 210-N function in the same manner, are configured in the same manner, and include identical or similar components. Each protection module 210-1 to 210-N includes a respective motor overload module 212-1 to 212-N in series with a respective switching relay 214-1 to 214-N that has at least the first and second states. Each of the protection modules 210-1 to 210-N is coupled to the VFD 240 via the control path 209. The control path 209 is a multi-wire control cable that includes a separate cable for each of the protection modules 210-1 to 210-N. Each protection module 210-1 to 210-N provides respective data 208-1 to 208-N.

The state of each switching relay 214-1 to 214-N is independent of the state of any other of the relays. Thus, some of the switching relays 214-1 to 214-N may be in the first state while the other of the switching relays 214-1 to 214-N are in the second state. The VFD 240 generates control signals 204-1 to 204-N to control respective switching relays 214-1 to 214-N. Each control signal 204-1 to 204-N may be, for example, a voltage signal that is sufficient to cause one or more electronic components in the respective switching relay 214-1 to 214-N to change state.

Moreover, like the switching relay 214-1 discussed above, all of the switching relays 214-1 to 214-N have a current interruption rating that is less than the continuous current rating of the respective motor 230-1 to 230-N. Thus, relatively small and/or thermally efficient electronic components may be used in all of the switching relays 214-1 to 214-N. Using such electronic components allows the protection module 210-1 to be smaller than an implementation that is configured to break the driver signal 207. Thus, as compared to an implementation in which the protection modules include components that are configured to interrupt the driver signal 207, the protection modules 210-1 to 210-N occupy a smaller volume of space and may be more thermally efficient (for example, produce less heat). As a result, a greater number of the protection modules 210-1 to 210-N may be placed in the same sized housing, such that more motors may be controlled. Alternatively, a smaller sized housing may be used with the same number of modules 210-1 to 210-N. This reduction in size increases the versatility of the system 200 by allowing the system 200 to be used in areas with limited space.

The VFD 240 includes an electronic processing module 241, an electronic storage 242, and the input/output (I/O) interface 243. The electronic processing module 241 includes one or more electronic processors. The electronic processors of the electronic processing module 241 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 242 may be any type of electronic memory that is capable of storing data and instructions in the form of computer programs or software, and the electronic storage 242 may include volatile and/or non-volatile components. The electronic storage 242 and the electronic processing module 241 are coupled such that the electronic processing module 241 is able to access or read data from and write data to the electronic storage 242. The electronic storage 242 stores instructions or logic, for example, in the form of a computer program, function, or procedure that govern the operations of the VFD 240 and the interaction between the VFD 240 and the protection modules 210-1 to 210-N. The electronic storage 242 may store instructions for processing the data 208. For example, the electronic storage 242 may store a threshold current level that, when exceeded, cause the VFD 240 to interrupt the driver signal 207. Furthermore, the electronic storage 242 may store instructions that, when executed, cause the electronic processing module 241 to generate control signals 204-1 to 204-N, which are provided to respective switching relays 214-1 to 214-N. Each control signal 204-1 to 204-N is sufficient to change the state of the respective switching relay 214-1 to 214-N. For example, the control signals 204-1 to 204-N may be voltage signals, and each switching relay 214-1 to 214-N may include a transistor. In this implementation, to change the state of a particular one of the switching relays 214-1 to 214-N, the control signal is applied to, for example, a gate of the transistor of that switching apparatus to change the state of that switching apparatus.

The I/O interface 243 is any interface that allows a human operator, another machine, and/or an autonomous process to interact with the VFD 240. Additionally, the VFD 240 communicates with the protection apparatus 210 through the I/O interface 243. For example, the control path 209 is electrically coupled to the I/O interface 243 such that the I/O interface 243 provides the control signals 204-1 to 204-N to the wires of the control cable and receives the data 208-1 to 208-N from the protection apparatus 210.

The I/O interface 243 may include, for example, a display (such as a liquid crystal display (LCD)), a keyboard, a control pad, audio input and/or output (such as speakers and/or a microphone), visual output (such as lights, light emitting diodes (LED)) that are in addition to or instead of the display, serial or parallel port, a Universal Serial Bus (USB) connection, any type of electrical connection interface, and/or any type of network interface, such as, for example, Ethernet. The I/O interface 243 also may allow communication without physical contact through, for example, an IEEE 802.11, Bluetooth, or a near-field communication (NFC) connection. The VFD 240 may be, for example, operated, configured, modified, or updated through the I/O interface 243.

The I/O interface 243 also may allow the VFD 240 to communicate with systems external to and remote from the VFD 240. For example, the I/O interface 243 may include a communications interface that allows communication between the VFD 240 and a remote station (not shown), or between the VFD 240 and a separate computing system. The remote station or separate computing system may be any type of station through which an operator is able to communicate with the VFD 240. For example, the remote station or the separate computing system may be a computer-based work station, a smart phone, tablet, or a laptop computer that connects to the VFD 240 via a services protocol, a remote control that connects to the VFD 240 via a radio-frequency signal, and/or an industrial device that connects to the VFD 240 via the SCADA protocol or an automation protocol (such as, for example, Fieldbus or Modbus).

The VFD 240 also includes an electrical network 245. The electrical network 245 includes electronic components. The electronic components may include passive components such as, for example, diodes, transistors, resistors, inductors, and/or capacitors. The electronic components also may include active components, such as DC power supplies, that are used with the passive components. The electrical network 245 is configured to produce the driver signal 207 based on the electrical power from the source 102. For example, the electrical network 245 may include a rectifier that converts the three-phase AC electrical power from the source 102 into a three-phase direct-current (DC) electrical signal. The rectifier may include a network of diodes. The electrical network 245 also may include a DC link or bus that stores the DC electrical signal. The electrical network 245 also may include a network of power transistors and/or other components arranged to form an inverter that coverts the DC electrical signal into an AC signal having a specific voltage amplitude and frequency to thereby generate the driver signal 207. The inverter is controllable such that the driver signal 207 is an voltage signal with characteristics that allow the motors 230-1 to 230-N to be driven at a speed and torque required by the loads 233-1 to 233-N.

Figure 3A:
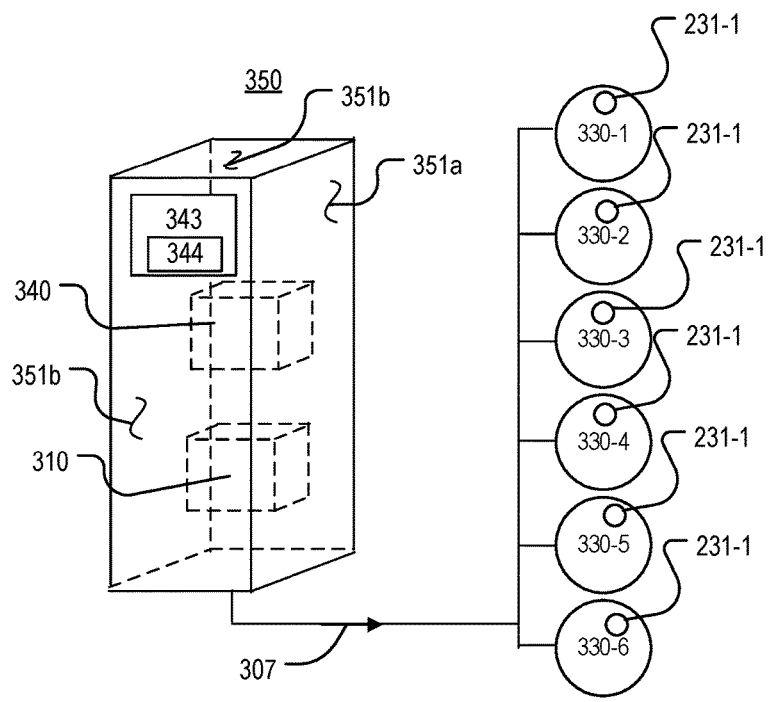
FIG. 3A is a perspective view of an example of a housing that encloses a VFD.

FIG. 3A is a perspective view of a housing 350 that encloses a VFD 340 and a protection apparatus 310. In FIG. 3A, hidden lines and objects are represented by lines with a dashed line style. In the example of FIG. 3A, the housing 350 is a rectangular cuboid that has six rectangular walls that define an interior region 352. Three of the walls are labeled in FIG. 3A as walls 351a, 351b, 351c. The six walls are collectively referred to as the walls 351. The walls 351 are made of a rugged material, such as, for example, metal, that is capable of protecting the interior region 352 from moisture ingress and damage. In some implementations one or more of the walls 351 may be or include a door or other device that is removable and allows access to the interior region 352.

The VFD 340 provides a driver signal 307 to motors 330-1 to 330-6. Each of the motors 330-1 to 330-6 is an AC motor that includes a respective element 331-1 to 331-6 (such as a rotor) that moves (for example, rotates or spins) relative to a stationary portion to convert electrical energy in the driver signal 307 to mechanical energy that drives a load.

The VFD 340 is similar to the VFD 140 and the VFD 240 discussed above. The VFD 340 includes an I/O interface 343 that includes a keypad 344. The keypad 344 is accessible from an exterior of the housing 350 such that a human operator is able to provide commands to the VFD 340. The I/O interface 343 is illustrated as being on the wall 351b. However, portions of the I/O interface 343 may be in the interior region 352. For example, the I/O interface 343 may include electronics that are associated with the keyboard, and these electronics are in the interior region 352. In another example, the I/O interface 343 may include wires and/or electrical cables that enable the VFD 340 to communicate with the protection apparatus 310. These wires and/or electrical cables also may be in the interior region 352. Additionally, like the VFD 240, the VFD 340 includes an electronic processor and an electronic storage (not shown in FIG. 3A), and these items may be in the interior region 352.

Figure 3B:
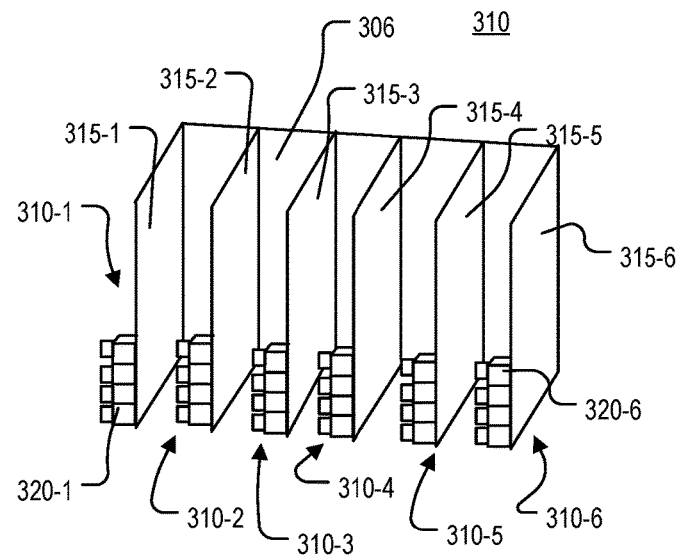
FIG. 3B is a perspective view of an example of a protection apparatus.
Figure 3C:
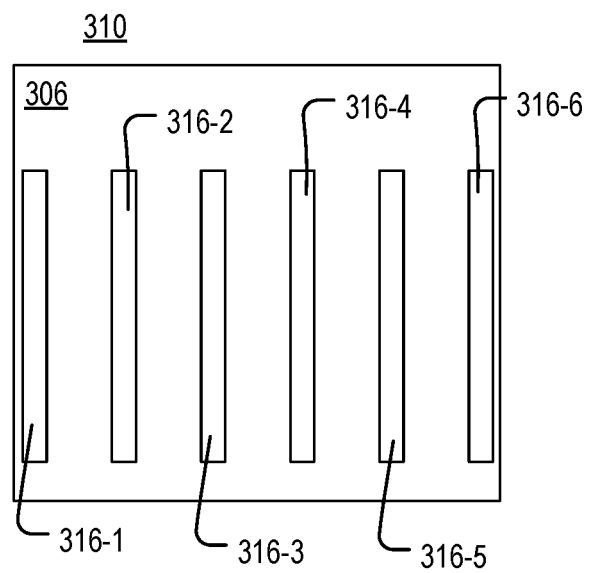
FIG. 3C is an example of a backplane.
Figure 3D:
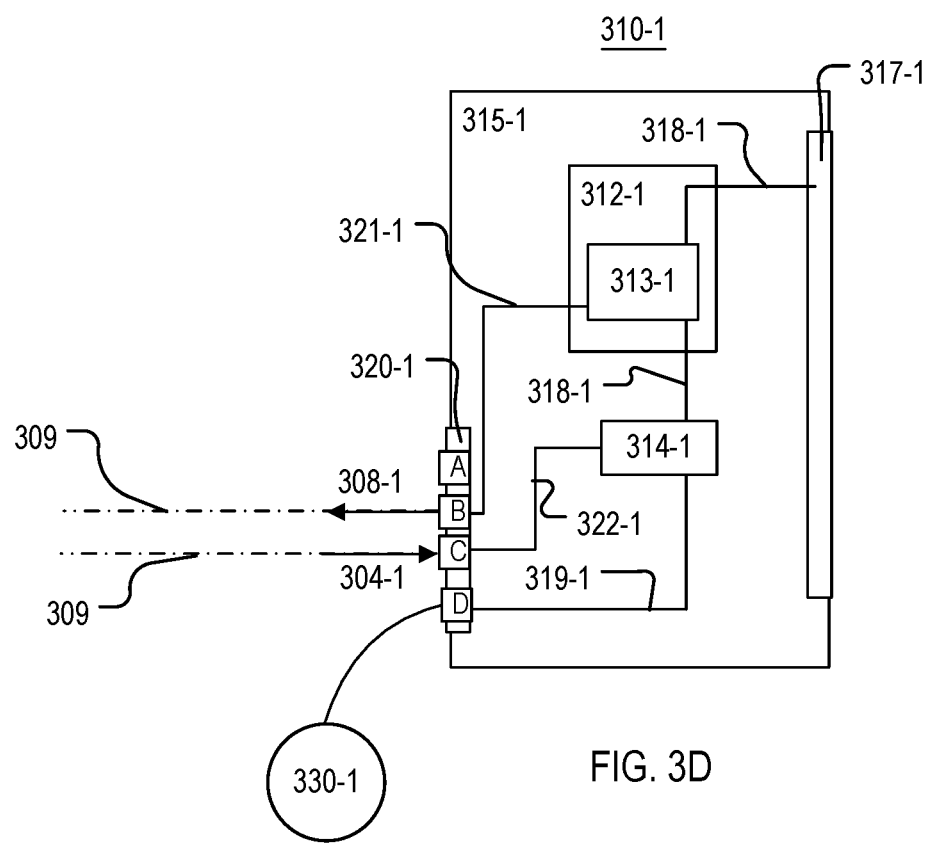
FIG. 3D is a schematic diagram of an example of a protection module.

Referring also to FIG. 3B, which is a perspective view of the protection apparatus 310, and to FIG. 3C, which shows a backplane 306, the protection apparatus 310 includes six protection modules 310-1, 310-2, 310-3, 310-4, 310-5, 310-6. Each protection module 310-1, 310-2, 310-3, 310-4, 310-5, 310-6 is similar to the protection module 210-1 discussed with respect to FIG. 2. Each protection module 310-1, 310-2, 310-3, 310-4, 310-5, 310-6 is implemented on a respective printed circuit board (PCB) 315-1, 315-2, 315-3, 315-4, 315-5, 315-6. A PCB includes sheets of an electrically conductive material (such as copper) laminated onto or placed between sheets of a non-conductive material. Conductive tracks of the conductive material are formed by etching or otherwise removing some the non-conductive material. Electrical components are soldered to the PCB and electrically connected to each other with the conductive tracks such that the PCB mechanically supports and electrically connects the electronic components.

The PCBs 315-1, 315-2, 315-3, 315-4, 315-5, 315-6 are electrically connected to respective electrical connectors 316-1, 316-2, 316-3, 316-4, 316-5, 316-6 on the backplane 306. The electrical connectors 316-1, 316-2, 316-3, 316-4, 316-5, 316-6 are in parallel with each other. Each electrical connector 316-1, 316-2, 316-3, 316-4, 316-5, 316-6 includes electrically conductive pins that electrically connect to each other and to an electrical interface of a separate PCB board. A particular pin in any of the electrical connectors 316-1, 316-2, 316-3, 316-4, 316-5, 316-6 is linked to the same relative pin in all of the other electrical connectors. The backplane 306 is electrically connected to all of the protection modules 310-1, 310-2, 310-3, 310-4, 310-5, 310-6 and acts as a bus that is able to carry electrical signals to all of the modules 310-1, 310-2, 310-3, 310-4, 310-5, 310-6. The backplane 306 is also electrically connected to the VFD 340. As such, the backplane 306 is configured to provide a driver signal 307 from the VFD 340 to all of the modules 310-1, 310-2, 310-3, 310-4, 310-5, 310-6.

FIG. 3D is a schematic diagram of the protection module 310-1. For simplicity, only the protection module 310-1 is discussed. However, the protection modules 310-2, 310-3, 310-4, 310-5, 310-6 are generally the same as the protection module 310-1.

The protection module 310-1 includes a motor overcurrent module 312-1 that is in series with a switching relay 314-1. The motor overcurrent module 312-1 includes a sensing module 313-1. The sensing module 313-1 measures one or more operating metrics of the motor 330-1. The sensing module 313-1 may be, for example, a current sensor and/or a voltage sensor.

The switching relay 314-1 includes one or more electrical components configured such that the switching relay 314-1 has at least a first state and a second state. For example, the switching relay 314-1 may include one or more transistors or other electronic components that are arranged in a configuration that has at least two states. In the first state, the switching relay 314-1 is electrically connected to the motor overcurrent module 312-1 such that current is able to flow through the protection module 310-1. In the second state, the switching relay 314-1 is not electrically connected to the motor overcurrent modules 312-1 and current does not flow through the protection module 310-1.

The switching relay 314-1 has a current interruption rating that is less than the continuous current rating of the motor 330-1. Thus, the switching relay 314-1 has a relatively low current interruption rating and uses electronic components that are small and conduct relatively low amounts of current. As such, the switching relay 314-1 may be mounted on the PCB 315-1.

The PCB 315-1 includes an electrical interface 317-1 that fits into the electrical connector 316-1 on the backplane 306. When the electrical interface 317-1 is in the electrical connector 316-1, a trace 318-1 is electrically connected to the bus 306 and the VFD 340. The trace 318-1 is a conductive path that is on the PCB 315-1. For example, the trace 318-1 may be a line of copper or another electrically conductive material. The trace 318-1 is electrically connected to the protection module 210-1 and the backplane 306 and to the switching relay 314-1. A trace 319-1 electrically connects the switching relay 314-1 to a terminal block 320-1. The terminal block 320-1 includes a plurality of ports, each of which secures a wire or electrically conductive cable. In the example of FIG. 3D, the ports are labeled A, B, C, D. Other configurations are possible. For example, the terminal block 320-1 may include more or fewer ports.

The trace 319-1 is electrically connected to the port D of the terminal block 320-1. The motor 330-1 is also electrically connected to the port D of the terminal block 320-1. When the switching relay 314-1 is in the first state, current flows from the trace 318-1 to the trace 319-1 and the terminal block 320. Thus, when the switching relay 314-1 is in the first state, current may flow to the motor 330-1 and the motor 330-1 may receive the driver signal 307 from the VFD 340. When the switching relay 314-1 is in the second state, current does not flow from the trace 318-1 to the trace 319-1. Thus, when the switching relay 314-1 is in the second state, the motor 330-1 does not receive the driver signal 307 from the VFD.

The ports B and C of the terminal block 320-1 are electrically connected to the I/O interface 343 of the VFD 340 via a control path 309. The control path 309 may include wires, cables, or any other medium that is capable of transmitting electrical signals. The terminal B is also electrically connected to the sensing module 313-1 via a trace 321-1. The terminal C is also connected to the switching relay 314-1 via a trace 322-1.

The protection modules 310-2 to 310-6 are the same as the protection module 310-1. The protective modules 310-1 to 310-6 are connected to the electrical connectors 316-2 to 316-6, respectively. As discussed above, the electrical connectors 316-2 to 316-6 are connected to the bus 306 and are in parallel with each other. Thus, when the protection modules 310-1 to 310-6 are connected to the electrical connectors 316-1 to 316-6, respectively, the protection modules 310-1 to 310-6 are electrically connected to the bus 306 and are in parallel with each other and each receive the driver signal 307. Like the protection module 310-1, each of the protection modules 310-2 to 310-6 communicates with the VFD 340.

Under ordinary operating conditions, none of the motors 330-1 to 330-6 have a fault condition. A fault condition is any type of condition in which the operation of a motor deviates from the specifications of the motor such that the performance of the motor is degraded or the motor is inoperable. For example, a motor has a fault condition when the motor draws more current than the continuous current rating of that motor. Under ordinary operating conditions, the switching relays 314-1 to 314-6 are in the first state, and the motors 330-1 and 330-6 are controlled by the driver signal 307. The sensing modules 313-1 to 313-6 measure one or more operating metrics of the motor 330-1 and provide data related to the measured operating metric to the VFD 340 via data signals 308-1 to 308-6. The data signals 308-1 to 308-6 may include an indication of an amount of current flowing in the traces 318-1 to 318-6 (which is an indication of the amount of current drawn by the motors 330-1 to 330-6).

The VFD 340 analyzes the data 308-1 to 308-6 and determines whether to interrupt the driver signal 307 based on the analysis. For example, the VFD 340 may compare the indication of the amount of current flowing in all of the traces 318-1 to 318-6 to a threshold current value to determine whether one or more of the motors 330-1 to 330-6 is drawing more than the rated continuous current.

The VFD 340 also determines which of the motors 330-1 to 330-6 have a fault condition. For example, the data 308-1 to 308-6 may include a code or other identifying information that associates the data signal with a particular one of the motors 330-1 to 330-6. The data 308-1 to 308-6 may include an indication of an amount of current flowing in the respective traces 318-1 to 318-6. In these implementations, the indication in the data 308-1 to 308-6 is compared to the rated continuous current for the respective motor 330-1 to 330-6. A motor that is associated with an indication that represents a measured current that exceeds the rated continuous current has a fault condition.

After identifying the motors that have a fault condition and while the driver signal 307 is not being provided to the bus 306, the VFD 340 controls the protection apparatus 310 such that motors that have a fault condition are not electrically connected to the VFD 340. For example, if the motors 330-1 and 330-5 are determined to have a fault condition, the VFD 340 generates a control signal 304-1 and a control signal 304-5. The control signal 304-5 is not shown but is similar to the control signal 304-1. The control signal 304-1 is provided to the terminal C of the terminal block 320-1. The control signal 304-5 is provided to the terminal C of a terminal block 320-5. The control signal 304-1 is applied to the switching relay 314-1 via the trace 321-1.

Similarly, the control signal 304-5 is applied to a switching relay 314-5 via a trace 321-5. The switching relay 314-5 is not shown but is similar to the switching relay 314-1.

The control signals 304-1 and 304-5 are sufficient to change a state of the switching relay 314-1 and 314-5, respectively. For example, the switching relay 314-1 may include a transistor that has a gate that is electrically connected to the trace 321-1, a drain that is electrically connected to the trace 318-1, and a source that is electrically connected to the trace 319-1. In these implementations, the control signal 304-1 is a voltage signal that is sufficient to transition the transistor from a first state in which current flows from the drain to the source to a second state in which current does not flow from the drain to the source. In these implementations, the switching relay 313-5 is configured in a similar manner, and the control signal 304-5 is a voltage signal that is sufficient to transition a transistor from the first state to the second state.

After the VFD 340 changes the state of the switching relays 314-1 and 314-5, the bus 306 is not electrically connected to the motor 330-1 or the motor 330-5. The VFD 340 again allows the driver signal 307 to flow to the bus 306. The driver signal 307 reaches the motors 330-2, 330-3, 330-4, and 330-6 but does not reach the motors 330-1 and 330-5. As such, the motors 330-2, 330-3, 330-4, and 330-6 receive the driver signal 307 and resume operation but the motors 330-1 and 330-5 do not receive the driver signal 307 and do not resume operation. This allows the motors 330-1 and 330-5 to be repaired and/or replaced by an operator while the other motors 330-2, 330-3, 330-4, and 330-6 continue to operate.

Thus, in addition to providing a configuration that uses smaller and/or less expensive electronic components and may be implemented on a printed circuit board in a relatively compact enclosure, the protection apparatus 310 also reduces the amount of downtime and the duration of service interruptions.

In some implementations, the VFD 340 continues to receive the data 308-1 to 308-6 after interrupting the driver signal 307. For example, the movable elements 331-1 to 331-6 will continue to rotate for a finite amount of time after the VFD 340 interrupts the driver signal 307. If the driver signal 307 is not restored, the movable elements 331-1 to 331-6 will eventually stop rotating. The VFD 340 may receive information about a rotation speed of the movable elements 331-1 to 331-6. In some implementations, the VFD 340 waits until all of the movable elements 331-1 to 331-6 have stopped rotating before restoring the driver signal 307.

In other implementations, the VFD 340 restores the driver signal 307 while some or all of the movable elements 331-1 to 331-6 are rotating. In these implementations, the VFD 340 estimates the speed of the movable elements 331-2, 331-3, 331-4, and 331-6 (which are associated with the motors that are still connected to the VFD 340) and adjusts the driver signal 307 such that the movable elements 331-2, 331-3, 331-4, and 331-6 are initially driven at their current speed. The VFD 340 may continue to adjust the driver signal 307 until the movable elements 330-2, 330-3, 330-4, and 330-6 are driven at steady state speeds. In these implementations, the end user may perceive less of a service interruption because the motors 330-2, 330-3, 330-4, and 330-6 continue to provide power to their respective loads.

Other implementations are within the scope of the claims.

What is claimed is:

1. A system for controlling a plurality of motors, the system comprising:
    a variable frequency drive (VFD) configured to control at least one property of the motors, the VFD having a current interruption rating that is greater than a continuous current rating of all of the plurality of motors combined;
a bus electrically connected to the VFD; and
a plurality of protection modules, each protection module comprising:
a motor overload device electrically connected to a particular one of the plurality of motors; and
a switching relay in series with the motor overload device, the switching relay configured to connect the protection module to and disconnect the protection module from the bus, wherein
a state of the switching relay determines whether the protection module is electrically connected to the bus, the VFD is configured to control the state of the switching relay, and the switching relay has a current interruption rating that is less than the continuous current rating of the particular one of the plurality of motors.

2. The system of claim 1, further comprising a housing that holds the VFD, the bus, and the plurality of protection modules.

3. The system of claim 2, wherein each protection module further comprises a printed circuit board (PCB) that is mountable in the housing, and the motor overload device and the switching relay are mounted to the PCB.

4. The system of claim 3, wherein each protection module further comprises a terminal block mounted on each PCB, and the particular one of the plurality of motors and the motor overload device are electrically connected to each other via the terminal block.

5. The system of claim 3, wherein the bus is a backplane that is mountable in the housing, the backplane comprises a plurality of electrical connectors in parallel with each other, and each PCB is mounted to one of the plurality of electrical connectors such that all of the protection modules are connected to the backplane and are in parallel with each other.

6. The system of claim 1, wherein each motor overload device comprises at least one sensing device configured to determine at least one operating metric of the particular one of the plurality of motors, and the VFD receives information about the at least one operating metric from all of the protection modules that are electrically connected to the bus.

7. The system of claim 6, wherein the at least one sensing device comprises a current sensor and/or a voltage sensor, and the at least one operating metric comprises an amount of current drawn by the particular one of the plurality of motors, a phase of current drawn by the particular one of the plurality of motors, and/or a voltage applied to the particular one of the plurality of motors.

8. The system of claim 7, wherein the VFD is configured to analyze the information and determine whether one or more of the plurality of motors is in a fault condition.

9. The system of claim 8, wherein the VFD is configured to prevent electricity from flowing to the bus based on a determination that at least one of the plurality of motors is in a fault condition.

10. The system of claim 9, wherein the VFD is configured to determine which one or more of the plurality of motors is in a fault condition and to change the state of the switching relay in the one or more protection modules connected to the one or more of the plurality of motors in the fault condition such the one or more protection modules are disconnected from the bus.

11. The system of claim 10, wherein, the VFD is configured to allow electricity to flow to the bus such that electricity is provided to all of the motors except for the one or more motors that are in the fault condition after the one or more protection modules are disconnected from the bus.

12. The system of claim 11, wherein each of the motors comprises an element that is configured to spin, and the VFD is configured to allow electricity to flow to the bus after the one or more protection modules are disconnected from the bus and before all of the motors stop spinning.

13. The system of claim 1, wherein the motor overload device is configured to: sense at least one operating metric of a current drawn by the particular one of the motors and determine an indication of the at least one operating metric, and wherein
the VFD is configured to control the state of the switching relay based on the indication of the sensed operating metric.

14. The system of claim 13, wherein the motor overload device comprises: a sensing device, an electronic storage, and one or more electronic processors, and wherein, the electronic storage comprises information related to at least one current threshold at which to disconnect the protection module from the bus.

15. The system of claim 14, wherein to determine an indication of the at least one operating metric, the motor overload device is configured to compare a sensed amount of current drawn by the particular one of the plurality of motors to the information related to the at least one current threshold at which to disconnect the protection module from the bus, and the indication of the at least one operating metric comprises an indication of whether the sensed amount of current drawn meets or exceeds the at least one current threshold at which to disconnect the protection module from the bus.

16. The system of claim 1, wherein the motor overload device comprises a normally open relay and a normally closed relay.

17. An apparatus for use with a plurality of motors, the apparatus comprising:
a plurality of protection modules, each protection module being configured for connection to a bus and to a particular one of the plurality of motors, each protection module comprising:
a motor overload device electrically connected to a particular one of the plurality of motors; and
a switching relay in series with the motor overload device, the switching relay configured to connect the protection module to and disconnect the protection module from the bus, wherein
a state of the switching relay determines whether the protection module is electrically connected to the bus, and the switching relay has a current interruption rating that is less than a continuous current rating of the particular one of the plurality of motors.

18. The apparatus of claim 17, wherein the bus is configured for connection to a variable-frequency drive (VFD) that has a current interruption rating that is at least equal to a continuous current rating of all of the plurality of motors combined.

19. The apparatus of claim 17, wherein each protection module further comprises a printed circuit board (PCB), and the motor overload device and the switching relay are mounted on the PCB.

20. The apparatus of claim 17, wherein the motor overload device comprises a sensor configured to sense an operating metric of the particular one of the plurality of motors and to determine an indication of the operating metric, and wherein the state of the switching relay is based on the indication of the operating metric.

* * * * *